(12) United States Patent
Benakli et al.

(10) Patent No.: US 8,289,647 B2
(45) Date of Patent: Oct. 16, 2012

(54) MAGNETIC RECORDING HEAD WITH NOTCHED SHIELD

(75) Inventors: Mourad Benakli, Bloomington, MN (US); Sharat Batra, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 157 days.

(21) Appl. No.: 12/710,456

(22) Filed: Feb. 23, 2010

(65) Prior Publication Data

US 2011/0205671 A1   Aug. 25, 2011

(51) Int. Cl.
G11B 5/11 (2006.01)
G11B 5/23 (2006.01)
G11B 5/235 (2006.01)
G11B 5/31 (2006.01)

(52) U.S. Cl. ............ 360/119.04; 360/125.16; 360/125.3

(58) Field of Classification Search ............. 360/119.02, 360/119.04, 125.3, 125.16
See application file for complete search history.

(56) References Cited

U.S. PATENT DOCUMENTS

| | | | |
|---|---|---|---|
| 4,935,832 A | 6/1990 | Das et al. | |
| 6,504,675 B1 | 1/2003 | Shukh et al. | |
| 6,707,642 B1 | 3/2004 | Batra | |
| 6,842,313 B1 | 1/2005 | Mallary | |
| 6,954,340 B2 | 10/2005 | Shukh et al. | |
| 7,002,775 B2 | 2/2006 | Hsu et al. | |
| 7,009,812 B2 | 3/2006 | Hsu et al. | |
| 7,265,941 B2 | 9/2007 | Le et al. | |
| 7,337,530 B1 | 3/2008 | Stoev et al. | |
| 2006/0198049 A1* | 9/2006 | Sasaki et al. | 360/126 |
| 2008/0068747 A1* | 3/2008 | Sasaki et al. | 360/110 |
| 2008/0278853 A1* | 11/2008 | Kameda et al. | 360/119.02 |
| 2008/0278862 A1* | 11/2008 | Kameda et al. | 360/319 |
| 2009/0168240 A1* | 7/2009 | Hsiao et al. | 360/125.02 |

* cited by examiner

*Primary Examiner* — Craig A. Renner
(74) *Attorney, Agent, or Firm* — Mueting Raasch & Gebhardt PA

(57) ABSTRACT

A magnetic recording head includes a magnetic recording write element including a main pole having a leading edge, an opposing trailing edge, a first side surface and a second side surface. A first side magnetic shield is positioned adjacent the first side surface and a second side magnetic shield positioned adjacent to the second side surface. First and second side shields are separated from the main pole by a first and second side shield gap. A front magnetic shield is separated from the main pole trailing edge by a front shield gap. A recess extends into the front shield adjacent to the trailing edge, and parallel to the trailing edge, and extends laterally away from the main pole and into the front shield a distance greater than the first or second side shield gap.

9 Claims, 4 Drawing Sheets

MAGNETIC RECORDING HEAD WITH NOTCHED SHIELD

BACKGROUND

With increased recording densities, the dimensions of the magnetic recording sensor are decreased to sense the magnetic flux of each bit on the magnetic medium. A consequence of decreasing the size of the magnetic recording sensor is there is a significant drop in the on-track field which requires a low coercivity media to maintain acceptable writing. As the size of the magnetic recording sensor is reduced, generally the fringe field is also reduced, however, the quantity WPE (write plus erase width)—TPW (top pole width) remains somewhat constant due to lack of scaling of head to media spacing. WPE is defined by the cross-track width of the recorded pattern. Side shields help to reduce the fringe field and consequently WPE, however side shields also reduce on-track field. This reduction in on-track field requires the use of even smaller coercivity for the media that increases WPE. This reduction of on-track field offsets the reduction in WPE for side shield design, thereby limiting areal density improvement. What is desired is a side shield design that reduces WPE while minimizing on-track field loss.

BRIEF SUMMARY

The present disclosure relates to a magnetic recording head with notched shields. The present disclosure can improve the areal density capabilities of a perpendicular magnetic writer.

In an embodiment, a magnetic recording head includes a magnetic recording write element including a main pole. The main pole has a leading edge and an opposing trailing edge and a first side surface and a second side surface separating the leading edge from the trailing edge. A first side magnetic shield is positioned adjacent the first side surface and a second side magnetic shield positioned adjacent to the second side surface. A first side shield gap separates the first side shield from the first side of the main pole. A second side shield gap separates the second side shield from the second side of the main pole. A front magnetic shield is separated from the main pole trailing edge by a front shield gap. A recess extends into the front shield adjacent to the trailing edge, and parallel to the trailing edge. The recess extends laterally away from the main pole and into the front shield a distance greater than the first side shield gap or second side shield gap.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
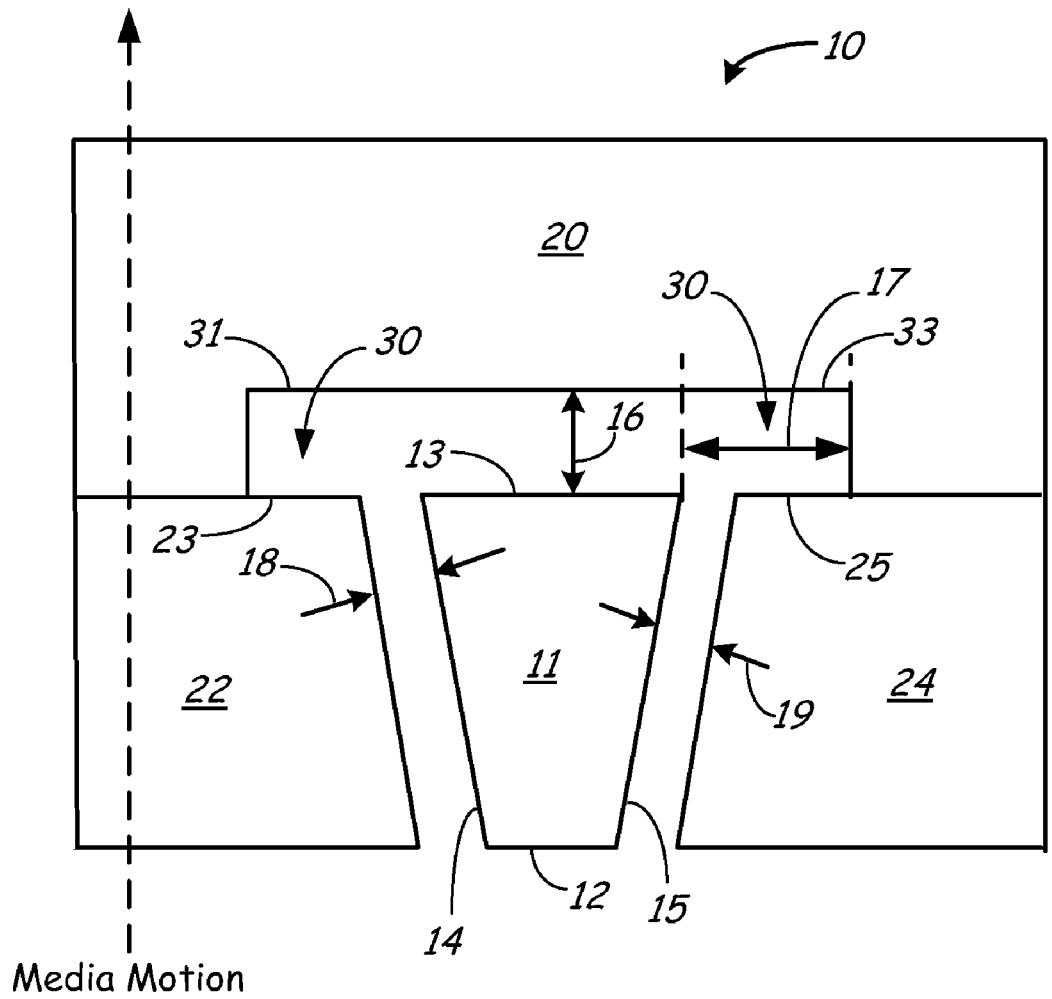
FIG. 1 is a schematic diagram front view of an air bearing surface of a perpendicular magnetic recording head.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above, "below", etc. may be used in this disclosure. These terms should not be construed as limiting the position or orientation of a structure, but should be used as providing spatial relationship between the structures. Other layers, such as seed or capping layers, are not depicted for clarity but could be included as technical need arises.

The present disclosure relates to a perpendicular magnetic recording head with notched shields. The present disclosure can improve the areal density capabilities of a perpendicular magnetic writer. A recess is present in the perpendicular magnetic writer head. The recess extends into the front shield adjacent to a trailing edge of the main write pole and parallel to the trailing edge of the main write pole. The recess extends laterally away from the main pole and into the front shield a distance being greater than the first side shield gap or second side shield gap. The recess minimizes magnetic field (amplitude and gradient) loss while maximizing recording density. This design provides larger on-track magnetic field while reducing the magnetic fringe field resulting in the ability to record at a higher areal density. While the present disclosure is not so limited, an appreciation of various aspects of the disclosure will be gained through a discussion of the examples provided below.

Figure 2:
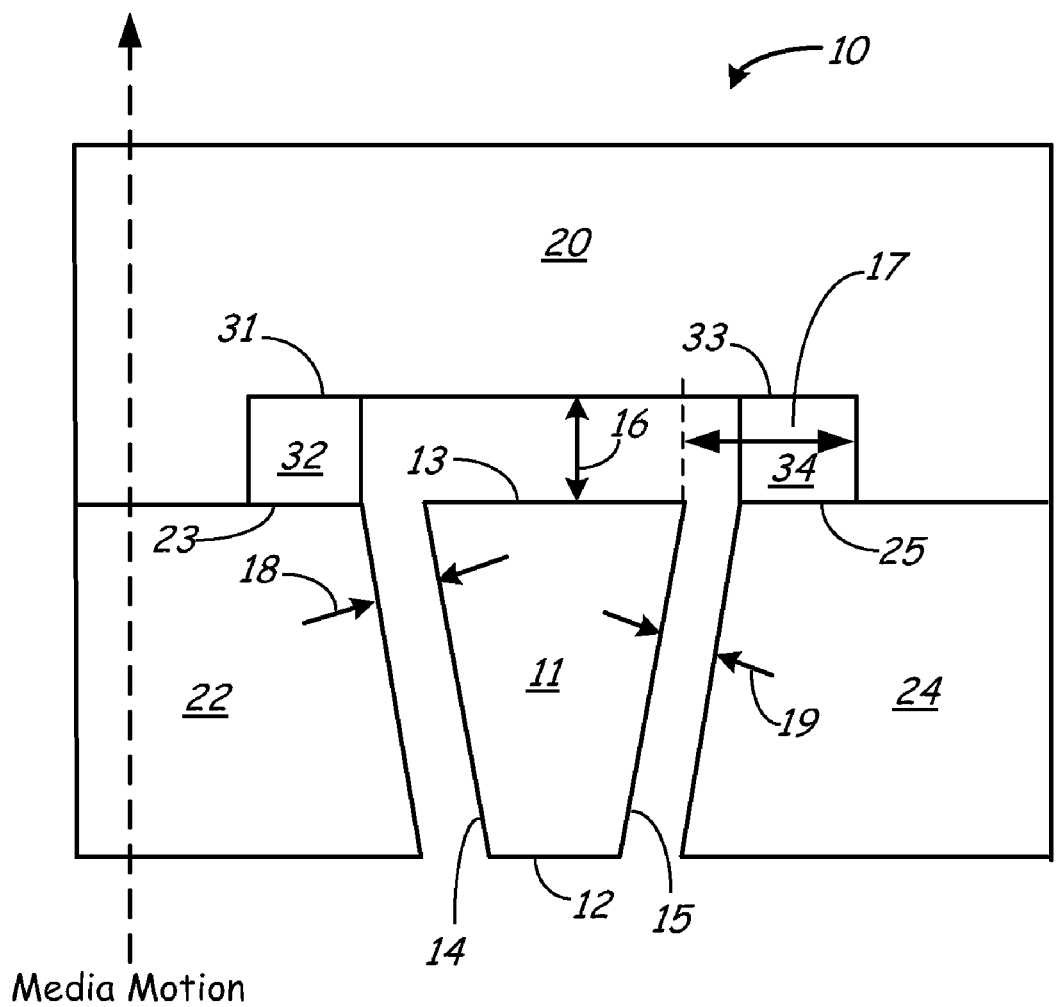
FIG. 2 is a schematic diagram front view of an air bearing surface of another perpendicular magnetic recording head.

FIG. 1 is a schematic diagram front view of an air bearing surface of a perpendicular magnetic recording head 10. FIG. 2 is a schematic diagram front view of an air bearing surface of another perpendicular magnetic recording head 10. Media motion across the air bearing surface of a perpendicular magnetic recording head 10 is illustrated with a dashed arrow. The perpendicular magnetic recording head 10 includes a perpendicular magnetic recording write element including a main pole 11. The main pole 11 has a leading edge 12 and an opposing trailing edge 13 and a first side surface 14 and a second side surface 15 separating the leading edge 12 from the trailing edge 13.

In many embodiments, the leading edge 12 and the opposing trailing edge 13 are substantially parallel. In many embodiments, to suppress side writing, the trailing edge 13 is dimensionally larger then the leading edge 12.

A front magnetic shield 20 is separated from the main pole 11 trailing edge 13 by a front shield gap 16. The front magnetic shield 20 intercepts fringing flux generated by the main pole 11. The front shield gap 16 can be filled with any non-magnetic material. The front shield gap 16 can have any useful lateral distance separating the front shield from the main pole 11. In some embodiments, the front shield gap 16 can be from 20 to 100 nanometers or from 40 to 80 nanometers.

A first side magnetic shield 22 is positioned adjacent the first side surface 14 and a second side magnetic shield 24 is positioned adjacent to the second side surface 15. A first side shield gap 18 separates the first side shield 22 from the first side 14 of the main pole 11. A second side shield gap 19 separates the second side shield 24 from the second side 15 of the main pole 11. The side shields 22, 24 intercept fringing flux generated by the main pole 11 and prevent erasing or weakening of prior recorded information on adjacent tracks of the media. The side shield gaps 18, 19 can be filled with any non-magnetic material. The side shield gaps 18, 19 can have any useful lateral distance separating the shield from the main pole 11. In some embodiments, the side shield gaps 18, 19 can be from 20 to 100 nanometers or from 40 to 80 nanometers.

A recess or notch 30 extends into the front shield 20 adjacent to the trailing edge 13 and parallel to the trailing edge 13. The recess 30 extends laterally away from the main pole 11 and into the front shield 20 a distance 17 greater than the first side shield gap 18 or second side shield gap 19. The recess 30 can be filled with any non-magnetic material. The recess 30 can have any useful lateral distance extending over the first and/or second side shield 22, 24. The recess 30 can extend laterally into the front shield 20 adjacent to the trailing edge 13, and parallel to the trailing edge 13. The recess 30 can separate a recess portion 31 of the front shield 20 and a portion 23 of the first side shield 22. The recess 30 can separate a second recess portion 33 of the front shield 20 and a portion 25 of the second side shield 24.

The recess 30 can expose a portion 23 of the first side shield 22 and separates the recess portion 31 of the front shield 20 and a portion 23 of the first side shield 22. The recess 30 can expose a portion 25 of the second side shield 24 and separates the recess portion 33 of the front shield 20 and a portion 25 of the first side shield 22.

In some embodiments, the recess 30 extends over the first and/or second side shield front shield 22, 24 a distance in a range from 0.25 to 2 times the first or second side shield gap 18, 19. In some embodiments, the recess 30 extends over the first and/or second side shield front shield 22, 24 a distance in a range from 5 to 100 nanometers. In some embodiments, the recess 30 extends over the first and/or second side shield front shield 22, 24 a distance in a range from 20 to 200 nanometers. In some embodiments, the recess 30 extends over the first and/or second side shield front shield 22, 24 a distance in a range from 20 to 150 nanometers.

Although the figures illustrate the recess 30 occurring on both sides of the main pole 11, it can occur on only one side in some embodiments.

FIG. 2 is a schematic diagram front view of an air bearing surface of another perpendicular magnetic recording head 10 where the recess 30 is filled with a weakly magnetic material 32, 34. In many embodiments the recess 30 is filled with a weakly magnetic material having a magnetic saturation flux density of 0.5 Tesla or less. The material 32 separates a recess portion 31 of the front shield 20 and a portion 23 of the first side shield 22. The material 34 separates a second recess portion 33 of the front shield 20 and a portion 25 of the second side shield 24.

Figure 3:
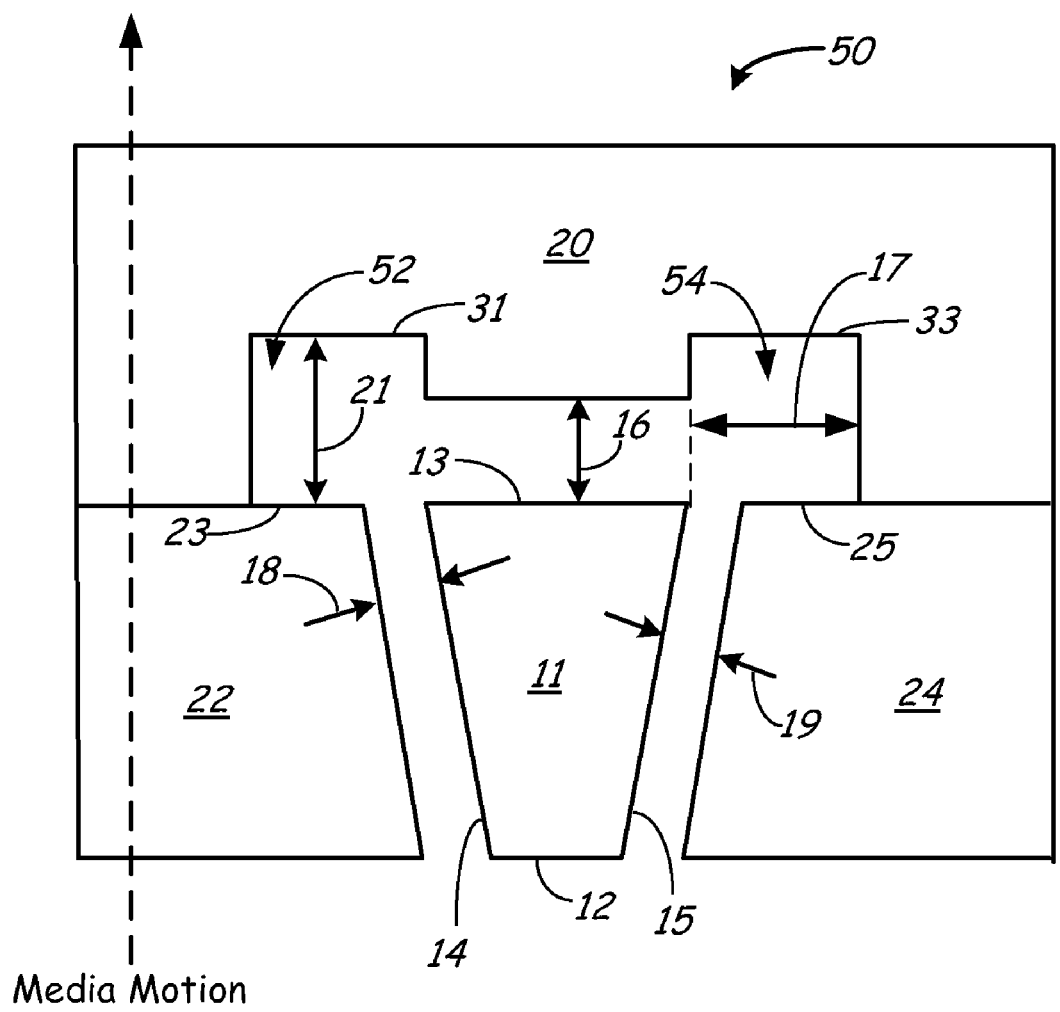
FIG. 3 is a schematic diagram front view of an air bearing surface of further perpendicular magnetic recording head.

FIG. 3 is a schematic diagram front view of an air bearing surface of further perpendicular magnetic recording head 50. Media motion across the air bearing surface of a perpendicular magnetic recording head 10 is illustrated with a dashed arrow. The perpendicular magnetic recording head 50 includes a notched recess 52, 54.

The perpendicular magnetic recording head 50 includes a perpendicular magnetic recording write element including a main pole 11. The main pole 11 has a leading edge 12 and an opposing trailing edge 13 and a first side surface 14 and a second side surface 15 separating the leading edge 12 from the trailing edge 13.

In many embodiments, the leading edge 12 and the opposing trailing edge 13 are substantially parallel. In many embodiments, to suppress side writing, the trailing edge 13 is dimensionally larger then the leading edge 12.

A front magnetic shield 20 is separated from the main pole 11 trailing edge 13 by a front shield gap 16. The front magnetic shield 20 intercepts fringing flux generated by the main pole 11. The front shield gap 16 can be filled with any non-magnetic material. The front shield gap 16 can have any useful lateral distance separating the front shield from the main pole 11. In some embodiments, the front shield gap 16 can be from 20 to 100 nanometers or from 40 to 80 nanometers.

A first side magnetic shield 22 is positioned adjacent the first side surface 14 and a second side magnetic shield 24 is positioned adjacent to the second side surface 15. A first side shield gap 18 separates the first side shield 22 from the first side 14 of the main pole 11. A second side shield gap 19 separates the second side shield 24 from the second side 15 of the main pole 11. The side shields 22, 24 intercept fringing flux generated by the main pole 11 and prevent erasing or weakening of prior recorded information on adjacent tracks of the media. The side shield gaps 18, 19 can be filled with any non-magnetic material. The side shield gaps 18, 19 can have any useful lateral distance separating the shield from the main pole 11. In some embodiments, the side shield gaps 18, 19 can be from 20 to 100 nanometers or from 40 to 80 nanometers.

A notched recess 52, 54 extends into the front shield 20 adjacent to the trailing edge 13 and both parallel to and perpendicular to the trailing edge 13. The notched recess 52, 54 extends laterally away from the main pole 11 and into the front shield 20 a lateral distance 17 greater than the first side shield gap 18 or second side shield gap 19. The notched recess 52, 54 extends longitudinally away from the main pole 11 and into the front shield 20 a longitudinal distance 21 greater than the front shield gap 16.

The notched recess 52, 54 can be filled with any non-magnetic material. The notched recess 52, 54 can have any useful lateral distance extending over the first and/or second side shield 22, 24. The notched recess 52 can separate a recess portion 31 of the front shield 20 and a recess portion 23 of the first side shield 22. The notched recess 54 can separate a second recess portion 33 of the front shield 20 and a recess portion 25 of the second side shield 24.

The notched recess 52, 54 can expose a portion 23 of the first side shield 22 and separates the recess portion 31 of the front shield 20 and a recess portion 23 of the first side shield 22. The recess 30 can expose a portion 25 of the second side shield 24 and separates the recess portion 33 of the front shield 20 and a portion 25 of the first side shield 22.

In some embodiments, the notched recess 52, 54 extends over the first and/or second side shield front shield 22, 24 a distance in a range from 0.25 to 2 times the first or second side shield gap 18, 19. In some embodiments, the notched recess 52, 54 extends over the first and/or second side shield front shield 22, 24 a distance in a range from 5 to 100 nanometers. In some embodiments, the notched recess 52, 54 extends over the first and/or second side shield front shield 22, 24 a distance in a range from 20 to 200 nanometers. In some embodiments, the notched recess 52, 54 extends over the first and/or second side shield front shield 22, 24 a distance in a range from 20 to 150 nanometers.

In some embodiments, the notched recess 52, 54 extends in a direction perpendicular to the trailing edge a distance 21 in a range from 0.25-2 times the first or second side shield gap distance 18, 19. In some embodiments the notched recess 52, 54 extends in a direction perpendicular to the trailing edge a distance 21 in a range from 0.9-1.5 times the lateral distance 17. In one embodiment, the notched recess 52, 54 extends in a direction perpendicular to the trailing edge a distance 21 equal to the lateral distance 17.

Figure 4:
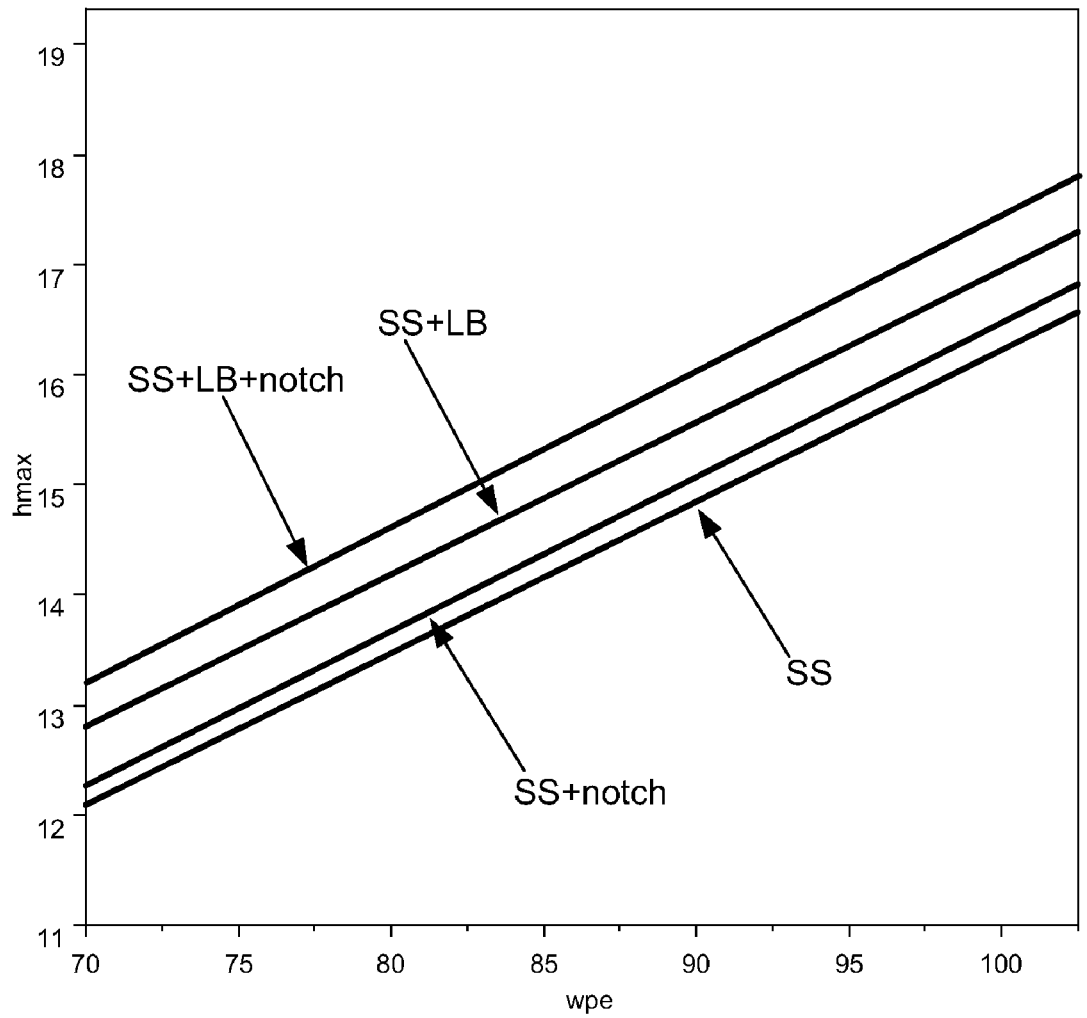
FIG. 4 is a graph of the WPE versus hmax for four perpendicular magnetic recording head designs The figures are not necessarily to scale. Like numbers used in the figures refer to like components. However, it will be understood that the use of a number to refer to a component in a given figure is not intended to limit the component in another figure labeled with the same number.

FIG. 4 is a graph of the WPE versus hmax for four perpendicular magnetic recording head designs. The first design SS is a perpendicular magnetic recording head that includes side shields with no recess into the front shield. The second design SS+notch is a perpendicular magnetic recording head that includes side shields with a notch design into the front shield vertically as shown with the distance arrow 21 of FIG. 3, but without the lateral recess shown with the distance arrow 17 of FIG. 3. The third design SS+LB is a perpendicular magnetic recording head that includes side shields with a letterbox recess design into the front shield laterally as shown in FIG. 1 and FIG. 2. The fourth design SS+LB+notch is a perpendicular magnetic recording head that includes side shields with a letterbox recess design and notch recess design into the front shield laterally as shown in FIG. 3. This graph illustrates the improved metrics over designs with just side shields or even designs with side shields and notch designs. The designs illustrated in FIG. 1 and FIG. 2 (SS+LB) and FIG. 3 (SS+LB+notch) all exhibit improved hmax as the WPE descreases. Thus, the claimed designs enable larger effective head fields for the WPE as compared to the SS and SS+notch designs.

Thus, embodiments of the MAGNETIC RECORDING HEAD WITH NOTCHED SHIELD are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An apparatus comprising:
  a magnetic recording write element including a main pole, the main pole having a leading edge and an opposing trailing edge and a first side surface and a second side surface separating the leading edge from the trailing edge;
  a first side magnetic shield positioned adjacent the first side surface and a second side magnetic shield positioned adjacent to the second side surface;
  a first side shield gap separates the first side shield from the first side surface of the main pole;
  a second side shield gap separates the second side shield from the second side surface of the main pole;
  a front magnetic shield is separated from the main pole trailing edge by a front shield gap; and
  an exposed side shield surface and a parallel exposed front shield portion define a recess extending into the front shield adjacent to the trailing edge, and parallel to the trailing edge, the recess extends laterally away from the main pole and into the front shield a distance greater than the first side shield gap or second side shield gap, the recess extends over the first side shield a distance in a range from 0.25-2 times the first side shield gap distance and the recess extends over the second side shield a distance in a range from 0.25-2 times the second side shield gap distance.

2. An apparatus according to claim 1, wherein the recess is filled with a non-magnetic material.

3. An apparatus according to claim 1, wherein the recess is filled with a weak magnetic material having a magnetic saturation flux density of 0.5 Tesla or less.

4. An apparatus according to claim 1, wherein the recess extends away from the main pole in a direction perpendicular to the lateral direction and into the front shield a distance greater than the front shield gap.

5. An apparatus according to claim 1, wherein the trailing edge has a length greater than the leading edge.

6. An apparatus comprising:
  a magnetic recording write element including a main pole, the main pole having a leading edge and an opposing trailing edge and a first side surface and a second side surface separating the leading edge from the trailing edge;
  a first side magnetic shield positioned adjacent the first side surface and a second side magnetic shield positioned adjacent to the second side surface;
  a first side shield gap separates the first side shield from the first side surface of the main pole;
  a second side shield gap separates the second side shield from the second side surface of the main pole;
  a front magnetic shield is separated from the main pole trailing edge by a front shield gap; and
  a notch extending laterally into the front shield adjacent to the trailing edge, and parallel to the trailing edge, the notch separates a recess portion of the front shield and a parallel recess portion of the first or second side shield, the notch extends over the first side shield a distance in a range from 0.25-2 times the first side shield gap distance and the notch extends over the second side shield a distance in a range from 0.25-2 times the second side shield gap distance.

7. An apparatus according to claim 6, wherein the notch is filled with a non-magnetic material.

8. An apparatus according to claim 6, wherein the notch is filled with a weak magnetic material having a magnetic saturation flux density of 0.5 Tesla or less.

9. An apparatus according to claim 6, wherein the notch extends away from the main pole in a direction perpendicular to the lateral direction and into the front shield a distance greater than the front shield gap.

* * * * *